United States Patent
Cloutier et al.

(10) Patent No.: US 10,055,614 B1
(45) Date of Patent: Aug. 21, 2018

(54) SYSTEMS AND METHODS FOR ADVANCED DETECTION MECHANISMS FOR MAGNETIC CARDS AND DEVICES

(75) Inventors: Bruce S. Cloutier, Jeannette, PA (US); Jeffrey D. Mullen, Pittsburgh, PA (US)

(73) Assignee: DYNAMICS INC., Pittsburgh, PA (US)

( * ) Notice: Subject to any disclaimer, the term of this patent is extended or adjusted under 35 U.S.C. 154(b) by 0 days.

(21) Appl. No.: 13/208,724

(22) Filed: Aug. 12, 2011
(Under 37 CFR 1.47)

Related U.S. Application Data (60) Provisional application No. 61/373,161, filed on Aug. 12, 2010.

(51) Int. Cl.
*G06K 7/10* (2006.01)
*G06K 7/00* (2006.01)

(52) U.S. Cl.
CPC ............................ *G06K 7/0095* (2013.01)

(58) Field of Classification Search
USPC ......................................................... 235/493
See application file for complete search history.

(56) References Cited

U.S. PATENT DOCUMENTS

| | | |
|---|---|---|
| 4,353,064 A | 10/1982 | Stamm |
| 4,394,654 A | 7/1983 | Hofmann-Cerfontaine |
| 4,614,861 A | 9/1986 | Pavlov et al. |
| 4,667,087 A | 5/1987 | Quintana |
| 4,701,601 A | 10/1987 | Francini et al. |
| 4,720,860 A | 1/1988 | Weiss |
| 4,786,791 A | 11/1988 | Hodama |
| 4,791,283 A | 12/1988 | Burkhardt |
| 4,797,542 A | 1/1989 | Hara |
| 5,038,251 A | 8/1991 | Sugiyama et al. |
| 5,168,520 A | 12/1992 | Weiss |
| 5,237,614 A | 8/1993 | Weiss |
| 5,276,311 A | 1/1994 | Hennige |
| 5,347,580 A | 9/1994 | Molva et al. |
| 5,361,062 A | 11/1994 | Weiss et al. |
| 5,412,199 A | 5/1995 | Finkelstein et al. |
| 5,434,398 A | 7/1995 | Goldberg |
| 5,434,405 A | 7/1995 | Finkelstein et al. |

(Continued)

FOREIGN PATENT DOCUMENTS

| | | |
|---|---|---|
| JP | 05210770 A | 8/1993 |
| WO | WO9852735 | 11/1998 |

(Continued)

OTHER PUBLICATIONS

U.S. Appl. No. 60/594,300, Poidomani et al.

(Continued)

*Primary Examiner* — Allyson Trail (57) ABSTRACT

A detection activity of a card may be sensitive to capacitance changes in adjacent and non-adjacent pads on the card. Accordingly, the detection activity may remain sensitive to faster-moving devices and/or reduced detection sampling rates. A second detection activity may follow a first detection activity, which may increase a probability of a successful communication sequence subsequent to the first detection activity. A card may, therefore, immediately transition to a low-power mode of operation after verification to reduce power consumption.

18 Claims, 6 Drawing Sheets

(56) References Cited

U.S. PATENT DOCUMENTS

| | | |
|---|---|---|
| 5,478,994 A | 12/1995 | Rahman |
| 5,479,512 A | 12/1995 | Weiss |
| 5,484,997 A | 1/1996 | Haynes |
| 5,485,519 A | 1/1996 | Weiss |
| 5,585,787 A | 12/1996 | Wallerstein |
| 5,591,949 A | 1/1997 | Bernstein |
| 5,608,203 A | 3/1997 | Finkelstein et al. |
| 5,623,552 A | 4/1997 | Lane |
| 5,657,388 A | 8/1997 | Weiss |
| 5,834,747 A | 11/1998 | Cooper |
| 5,834,756 A | 11/1998 | Gutman et al. |
| 5,856,661 A | 1/1999 | Finkelstein et al. |
| 5,864,623 A | 1/1999 | Messina et al. |
| 5,907,142 A | 5/1999 | Kelsey |
| 5,913,203 A | 6/1999 | Wong et al. |
| 5,937,394 A | 8/1999 | Wong et al. |
| 5,955,021 A | 9/1999 | Tiffany, III |
| 5,956,699 A | 9/1999 | Wong et al. |
| 6,025,054 A | 2/2000 | Tiffany, III |
| 6,045,043 A | 4/2000 | Bashan et al. |
| 6,076,163 A | 6/2000 | Hoffstein et al. |
| 6,085,320 A | 7/2000 | Kaliski |
| 6,095,416 A | 8/2000 | Grant et al. |
| 6,130,621 A | 10/2000 | Weiss |
| 6,145,079 A | 11/2000 | Mitty et al. |
| 6,157,920 A | 12/2000 | Jakobsson et al. |
| 6,161,181 A | 12/2000 | Haynes, III et al. |
| 6,176,430 B1 | 1/2001 | Finkelstein et al. |
| 6,182,894 B1 | 2/2001 | Hackett et al. |
| 6,189,098 B1 | 2/2001 | Kaliski |
| 6,199,052 B1 | 3/2001 | Mitty et al. |
| 6,206,293 B1 | 3/2001 | Gutman et al. |
| 6,240,184 B1 | 5/2001 | Huynh et al. |
| 6,241,153 B1 | 6/2001 | Tiffany, III |
| 6,256,873 B1 | 7/2001 | Tiffany, III |
| 6,269,163 B1 | 7/2001 | Rivest et al. |
| 6,286,022 B1 | 9/2001 | Kaliski et al. |
| 6,308,890 B1 | 10/2001 | Cooper |
| 6,313,724 B1 | 11/2001 | Osterweil |
| 6,389,442 B1 | 5/2002 | Yin et al. |
| 6,393,447 B1 | 5/2002 | Jakobsson et al. |
| 6,411,715 B1 | 6/2002 | Liskov et al. |
| 6,446,052 B1 | 9/2002 | Juels |
| 6,460,141 B1 | 10/2002 | Olden |
| 6,592,044 B1 | 7/2003 | Wong et al. |
| 6,607,127 B2 | 8/2003 | Wong |
| 6,609,654 B1 | 8/2003 | Anderson et al. |
| 6,631,849 B2 | 10/2003 | Blossom |
| 6,655,585 B2 | 12/2003 | Shinn |
| 6,681,988 B2 | 1/2004 | Stack et al. |
| 6,705,520 B1 | 3/2004 | Pitroda et al. |
| 6,755,341 B1 | 6/2004 | Wong et al. |
| 6,764,005 B2 | 7/2004 | Cooper |
| 6,769,618 B1 | 8/2004 | Finkelstein |
| 6,805,288 B2 | 10/2004 | Routhenstein et al. |
| 6,811,082 B2 | 11/2004 | Wong |
| 6,813,354 B1 | 11/2004 | Jakobsson et al. |
| 6,817,532 B2 | 11/2004 | Finkelstein |
| 6,873,974 B1 | 3/2005 | Schutzer |
| 6,902,116 B2 | 6/2005 | Finkelstein |
| 6,970,070 B2 | 11/2005 | Juels et al. |
| 6,980,969 B1 | 12/2005 | Tuchler et al. |
| 6,985,583 B1 | 1/2006 | Brainard et al. |
| 6,991,155 B2 | 1/2006 | Burchette, Jr. |
| 7,013,030 B2 | 3/2006 | Wong et al. |
| 7,035,443 B2 | 4/2006 | Wong |
| 7,039,223 B2 | 5/2006 | Wong |
| 7,044,394 B2 | 5/2006 | Brown |
| 7,051,929 B2 | 5/2006 | Li |
| 7,083,094 B2 | 8/2006 | Cooper |
| 7,100,049 B2 | 8/2006 | Gasparini et al. |
| 7,100,821 B2 | 9/2006 | Rasti |
| 7,111,172 B1 | 9/2006 | Duane et al. |
| 7,114,652 B2 | 10/2006 | Moullette et al. |
| 7,136,514 B1 | 11/2006 | Wong |
| 7,140,550 B2 | 11/2006 | Ramachandran |
| 7,163,153 B2 | 1/2007 | Blossom |
| 7,195,154 B2 | 3/2007 | Routhenstein |
| 7,197,639 B1 | 3/2007 | Juels et al. |
| 7,219,368 B2 | 5/2007 | Juels et al. |
| 7,225,537 B2 | 6/2007 | Reed |
| 7,225,994 B2 | 6/2007 | Finkelstein |
| 7,246,752 B2 | 7/2007 | Brown |
| 7,298,243 B2 | 11/2007 | Juels et al. |
| 7,334,732 B2 | 2/2008 | Cooper |
| 7,337,326 B2 | 2/2008 | Palmer et al. |
| 7,346,775 B2 | 3/2008 | Gasparini et al. |
| 7,356,696 B1 | 4/2008 | Jakobsson et al. |
| 7,357,319 B1 | 4/2008 | Lin et al. |
| 7,359,507 B2 | 4/2008 | Kaliski |
| 7,360,688 B1 | 4/2008 | Harris |
| 7,363,494 B2 | 4/2008 | Brainard et al. |
| 7,380,710 B2 | 6/2008 | Brown |
| 7,398,253 B1 | 7/2008 | Pinnell |
| 7,404,087 B2 | 7/2008 | Teunen |
| 7,424,570 B2 | 9/2008 | D'Albore et al. |
| 7,427,033 B1 | 9/2008 | Roskind |
| 7,454,349 B2 | 11/2008 | Teunen et al. |
| 7,461,250 B1 | 12/2008 | Duane et al. |
| 7,461,399 B2 | 12/2008 | Juels et al. |
| 7,472,093 B2 | 12/2008 | Juels |
| 7,472,829 B2 | 1/2009 | Brown |
| 7,494,055 B2 | 2/2009 | Fernandes et al. |
| 7,502,467 B2 | 3/2009 | Brainard et al. |
| 7,502,933 B2 | 3/2009 | Jakobsson et al. |
| 7,503,485 B1 | 3/2009 | Routhenstein |
| 7,516,492 B1 | 4/2009 | Nisbet et al. |
| 7,523,301 B2 | 4/2009 | Nisbet et al. |
| 7,530,495 B2 | 5/2009 | Cooper |
| 7,532,104 B2 | 5/2009 | Juels |
| 7,543,739 B2 | 6/2009 | Brown et al. |
| 7,559,464 B2 | 7/2009 | Routhenstein |
| 7,562,221 B2 | 7/2009 | Nystrom et al. |
| 7,562,222 B2 | 7/2009 | Gasparini et al. |
| 7,580,898 B2 | 8/2009 | Brown et al. |
| 7,584,153 B2 | 9/2009 | Brown et al. |
| 7,591,426 B2 | 9/2009 | Osterweil et al. |
| 7,591,427 B2 | 9/2009 | Osterweil |
| 7,602,904 B2 | 10/2009 | Juels et al. |
| 7,631,804 B2 | 12/2009 | Brown |
| 7,639,537 B2 | 12/2009 | Sepe et al. |
| 7,641,124 B2 | 1/2010 | Brown et al. |
| 7,660,902 B2 | 2/2010 | Graham et al. |
| 7,828,207 B2 | 11/2010 | Cooper |
| 8,348,172 B1 | 1/2013 | Cloutier et al. |
| 8,573,503 B1 | 11/2013 | Cloutier et al. |
| 8,746,579 B1 | 6/2014 | Cloutier et al. |
| 2001/0034702 A1 | 10/2001 | Mockett et al. |
| 2001/0047335 A1 | 11/2001 | Arndt et al. |
| 2002/0019807 A1* | 2/2002 | Halpern ......................... 705/39 |
| 2002/0059114 A1 | 5/2002 | Cockrill et al. |
| 2002/0082989 A1 | 6/2002 | Fife et al. |
| 2002/0096570 A1 | 7/2002 | Wong et al. |
| 2002/0120583 A1 | 8/2002 | Keresman, III et al. |
| 2003/0034388 A1 | 2/2003 | Routhenstein et al. |
| 2003/0052168 A1 | 3/2003 | Wong |
| 2003/0057278 A1 | 3/2003 | Wong |
| 2003/0116635 A1 | 6/2003 | Taban |
| 2003/0152253 A1 | 8/2003 | Wong |
| 2003/0163287 A1 | 8/2003 | Vock et al. |
| 2003/0173409 A1 | 9/2003 | Vogt et al. |
| 2003/0179909 A1 | 9/2003 | Wong et al. |
| 2003/0179910 A1 | 9/2003 | Wong |
| 2003/0226899 A1 | 12/2003 | Finkelstein |
| 2004/0035942 A1 | 2/2004 | Silverman |
| 2004/0054574 A1 | 3/2004 | Kaufman et al. |
| 2004/0133787 A1 | 7/2004 | Doughty |
| 2004/0162732 A1 | 8/2004 | Rahim et al. |
| 2004/0172535 A1 | 9/2004 | Jakobsson |
| 2004/0177045 A1 | 9/2004 | Brown |
| 2005/0043997 A1 | 2/2005 | Sahota et al. |
| 2005/0080747 A1 | 4/2005 | Anderson et al. |
| 2005/0086160 A1 | 4/2005 | Wong et al. |
| 2005/0086177 A1 | 4/2005 | Anderson et al. |

(56) References Cited

U.S. PATENT DOCUMENTS

| | | |
|---|---|---|
| 2005/0116026 A1 | 6/2005 | Burger et al. |
| 2005/0119940 A1 | 6/2005 | Concilio et al. |
| 2005/0154643 A1 | 7/2005 | Doan et al. |
| 2005/0228959 A1 | 10/2005 | D'Albore et al. |
| 2006/0000900 A1 | 1/2006 | Fernandes et al. |
| 2006/0037073 A1 | 2/2006 | Juels et al. |
| 2006/0041759 A1 | 2/2006 | Kaliski et al. |
| 2006/0085328 A1 | 4/2006 | Cohen et al. |
| 2006/0091223 A1 | 5/2006 | Zellner |
| 2006/0161435 A1 | 7/2006 | Atef et al. |
| 2006/0163353 A1 | 7/2006 | Moulette et al. |
| 2006/0174104 A1 | 8/2006 | Crichton et al. |
| 2006/0196931 A1 | 9/2006 | Holtmanns et al. |
| 2006/0256961 A1 | 11/2006 | Brainard et al. |
| 2007/0034700 A1 | 2/2007 | Poidomani et al. |
| 2007/0114274 A1 | 5/2007 | Gibbs et al. |
| 2007/0124321 A1 | 5/2007 | Szydlo |
| 2007/0152070 A1 | 7/2007 | D'Albore |
| 2007/0152072 A1 | 7/2007 | Frallicciardi et al. |
| 2007/0153487 A1 | 7/2007 | Frallicciardi et al. |
| 2007/0174614 A1 | 7/2007 | Duane et al. |
| 2007/0241183 A1 | 10/2007 | Brown et al. |
| 2007/0241201 A1 | 10/2007 | Brown et al. |
| 2007/0256123 A1 | 11/2007 | Duane et al. |
| 2007/0192249 A1 | 12/2007 | Biffle et al. |
| 2007/0291753 A1 | 12/2007 | Romano |
| 2008/0005510 A1 | 1/2008 | Sepe et al. |
| 2008/0008315 A1 | 1/2008 | Fontana et al. |
| 2008/0008322 A1 | 1/2008 | Fontana et al. |
| 2008/0010675 A1 | 1/2008 | Massascusa et al. |
| 2008/0016351 A1 | 1/2008 | Fontana et al. |
| 2008/0019507 A1 | 1/2008 | Fontana et al. |
| 2008/0028447 A1 | 1/2008 | O'Malley et al. |
| 2008/0040271 A1 | 2/2008 | Hammad et al. |
| 2008/0040276 A1 | 2/2008 | Hammad et al. |
| 2008/0058016 A1 | 3/2008 | Di Maggio et al. |
| 2008/0059379 A1 | 3/2008 | Ramaci et al. |
| 2008/0096326 A1 | 4/2008 | Reed |
| 2008/0126398 A1 | 5/2008 | Cimino |
| 2008/0128515 A1 | 6/2008 | Di Iorio |
| 2008/0148394 A1* | 6/2008 | Poidomani et al. ............ 726/20 |
| 2008/0201264 A1 | 8/2008 | Brown et al. |
| 2008/0209550 A1 | 8/2008 | Di Iorio |
| 2008/0288699 A1 | 11/2008 | Chichierchia |
| 2008/0294930 A1 | 11/2008 | Varone et al. |
| 2008/0302877 A1 | 12/2008 | Musella et al. |
| 2009/0013122 A1 | 1/2009 | Sepe et al. |
| 2009/0036147 A1 | 2/2009 | Romano |
| 2009/0046522 A1 | 2/2009 | Sepe et al. |
| 2009/0108064 A1 | 4/2009 | Fernandes et al. |
| 2009/0150295 A1 | 6/2009 | Hatch et al. |
| 2009/0152365 A1 | 6/2009 | Li et al. |
| 2009/0159700 A1 | 6/2009 | Mullen |
| 2009/0159713 A1* | 6/2009 | Mullen et al. ................ 235/493 |
| 2009/0242648 A1 | 10/2009 | Di Sirio et al. |
| 2009/0244858 A1 | 10/2009 | Di Sirio et al. |
| 2009/0253460 A1 | 10/2009 | Varone et al. |
| 2009/0255996 A1 | 10/2009 | Brown et al. |
| 2009/0290704 A1 | 11/2009 | Cimino |
| 2009/0303885 A1 | 12/2009 | Longo |
| 2010/0270373 A1* | 10/2010 | Poidomani et al. .......... 235/380 |
| 2011/0028184 A1 | 2/2011 | Cooper |

FOREIGN PATENT DOCUMENTS

| | | |
|---|---|---|
| WO | WO0247019 | 6/2002 |
| WO | WO06066322 | 6/2006 |
| WO | WO06080929 | 8/2006 |
| WO | WO06105092 | 10/2006 |
| WO | WO06116772 | 11/2006 |
| WO | WO08064403 | 6/2008 |

OTHER PUBLICATIONS

U.S. Appl. No. 60/675,388, Poidomani et al.
The Bank Credit Card Business. Second Edition, American Bankers Association, Washington, D.C., 1996.
A Day in the Life of a Flux Reversal. http://www.phrack.org/issues.html?issue=37&id=6#article. As viewed on Apr. 12, 2010.
Dynamic Virtual Credit Card Numbers. http://homes.cerias.purdue.edu/~jtli/paper/fc07.pdf. As viewed on Apr. 12, 2010.
English translation of JP 05210770 A.

* cited by examiner

SYSTEMS AND METHODS FOR ADVANCED DETECTION MECHANISMS FOR MAGNETIC CARDS AND DEVICES

CROSS-REFERENCE TO RELATED APPLICATION

This application claims the benefit of U.S. Provisional Patent Application No. 61/373,161, titled "SYSTEMS AND METHODS FOR ADVANCED DETECTION MECHANISMS FOR MAGNETIC CARDS AND DEVICES," filed Aug. 12, 2010, which is hereby incorporated by reference herein in its entirety.

BACKGROUND OF THE INVENTION

This invention relates to magnetic cards and devices and related systems.

SUMMARY OF THE INVENTION

A card may include a dynamic magnetic communications device, which may take the form of a magnetic encoder or a magnetic emulator. A magnetic encoder, for example, may be utilized to modify information that is located on a magnetic medium, such that a magnetic stripe reader may then be utilized to read the modified magnetic information from the magnetic medium. A magnetic emulator, for example, may be provided to generate electromagnetic fields that directly communicate data to a read-head of a magnetic stripe reader. A magnetic emulator, for example, may communicate data serially to a read-head of the magnetic stripe reader. A magnetic emulator, for example, may communicate data in parallel to a read-head of a magnetic stripe reader.

All, or substantially all, of the front surface, as well as the rear surface, of a card may be implemented as a display (e.g., bi-stable, non bi-stable, LCD, or electrochromic display). Electrodes of a display may be coupled to one or more touch sensors, such that a display may be sensitive to touch (e.g., using a finger or a pointing device) and may be further sensitive to a location of the touch. The display may be sensitive, for example, to objects that come within a proximity of the display without actually touching the display.

A dynamic magnetic stripe communications device may be implemented on a multiple layer board (e.g., a two-layer flexible printed circuit board). A coil for each track of information that is to be communicated by the dynamic magnetic stripe communications device may then be provided by including wire segments on each layer and interconnecting the wire segments through layer interconnections to create a coil. For example, a dynamic magnetic stripe communications device may include two coils such that two tracks of information may be communicated to two different read-heads included in a read-head housing of a magnetic stripe reader. A dynamic magnetic communications device may include, for example, three coils such that three tracks of information may be communicated to three different read-heads included in a read-head housing of a magnetic stripe reader.

Input and/or output devices may be included on a card, for example, to facilitate data exchange with the card. For example, an integrated circuit (IC) may be included on a card and exposed from the surface of the card. Such a chip (e.g., an EMV chip) may communicate information to a chip reader (e.g., an EMV chip reader). An RFID antenna or module may be included on a card, for example, to send and/or receive information between an RFID reader and the RFID included on the card.

One or more detectors may be provided, for example, to sense the presence of an external object, such as a person or device, which in turn, may trigger a communication sequence with the external object. Accordingly, for example, timing aspects of an information exchange between an external object and the various I/O devices implemented on a card may be determined by a processor of a card.

A sensed presence of an external object or device may include the type of object or device that is detected and, therefore, may then determine the type of communication that is to be used with the detected object or device. For example, a detected object may include a determination that the object is a read-head housing of a magnetic stripe reader. Such an identifying detection, for example, may activate a dynamic magnetic stripe communications device so that information is communicated (e.g., electromagnetically communicated) to the read-head of the magnetic stripe reader.

One or more read-head detectors, for example, may be provided on a card. The one or more read-head detectors may be provided as, for example, conductive pads that may be arranged along a length of a card having a variety of shapes. A property (e.g., a capacitance magnitude) of one or more of the conductive pads may, for example, change in response to contact with and/or the presence of an object.

A card may, for example, be swiped across a read-head of a magnetic stripe reader, such that a series of conductive pads arranged along a length of the card may be used to sequentially detect the presence of the read-head as the read-head moves in relation to the card. In doing so, for example, a series of detections (e.g., the capacitance magnitude of a series of conductive pads may increase and/or decrease) which may be indicative of a direction of a card swipe and/or a velocity of a card swipe and/or an acceleration of a card swipe.

In some instances, a width of a read-head may be wider than a single conductive pad (e.g., a read-head may span a width that may be substantially equal to a width of two conductive pads). As a result, more than one conductive pad may exhibit a change in capacitance magnitude when, for example, a read-head comes into contact with two or more conductive pads or when a read-head is positioned proximate to two or more conductive pads.

Rules may be implemented, for example, whereby a property change (e.g., an increased and/or decreased capacitance magnitude) detected in two or more conductive pads may be analyzed to enhance detection. Analysis of the property change in two or more conductive pads need not be performed with conductive pads that are adjacent to one another, but may be performed with conductive pads that are non-adjacent to one another. In so doing, a speed of a card swipe, for example, may be increased without sacrificing a detection accuracy of the card swipe (e.g., a card swipe speed may be doubled without losing the ability to detect a presence of a read-head housing or contact with a read-housing).

False alarm detection may be implemented to reduce occurrences of false alarms. For example, certain objects (e.g., a finger) may cause a processor of a card to detect, for example, a presence of a read-head housing of a magnetic stripe reader when, in fact, no read-head housing is present. In such instances, knowledge of, for example, a previously detected card swipe and associated direction may allow a second detection to be made, whereby a second read-head detection that is consistent with the originally detected card swipe direction may enable verification of a legitimate card swipe.

For example, an analysis of a capacitance magnitude change of two or more conductive pads of a row of conductive pads may be performed to determine, for example, a presence of a read-head and a direction of movement that the read-head exhibits relative to the row of conductive pads. A subsequent analysis of a capacitance magnitude change of two or more conductive pads along a row of conductive pads in the same direction as previously detected may serve to legitimize a first detection of a read-head.

A sampling mechanism may be used to measure, for example, a capacitance magnitude change of two or more conductive pads. A sampling rate (e.g., a reduced sampling rate) of the sampling mechanism may cause detections to occur in non-adjacent conductive pads. A successful detection may nevertheless occur since a detection algorithm may not require detections in adjacent conductive pads to achieve a positive detection result.

BRIEF DESCRIPTION OF THE DRAWINGS

The principles and advantages of the present invention can be more clearly understood from the following detailed description considered in conjunction with the following drawings, in which the same reference numerals denote the same structural elements throughout, and in which.

DETAILED DESCRIPTION OF THE INVENTION

Figure 1:
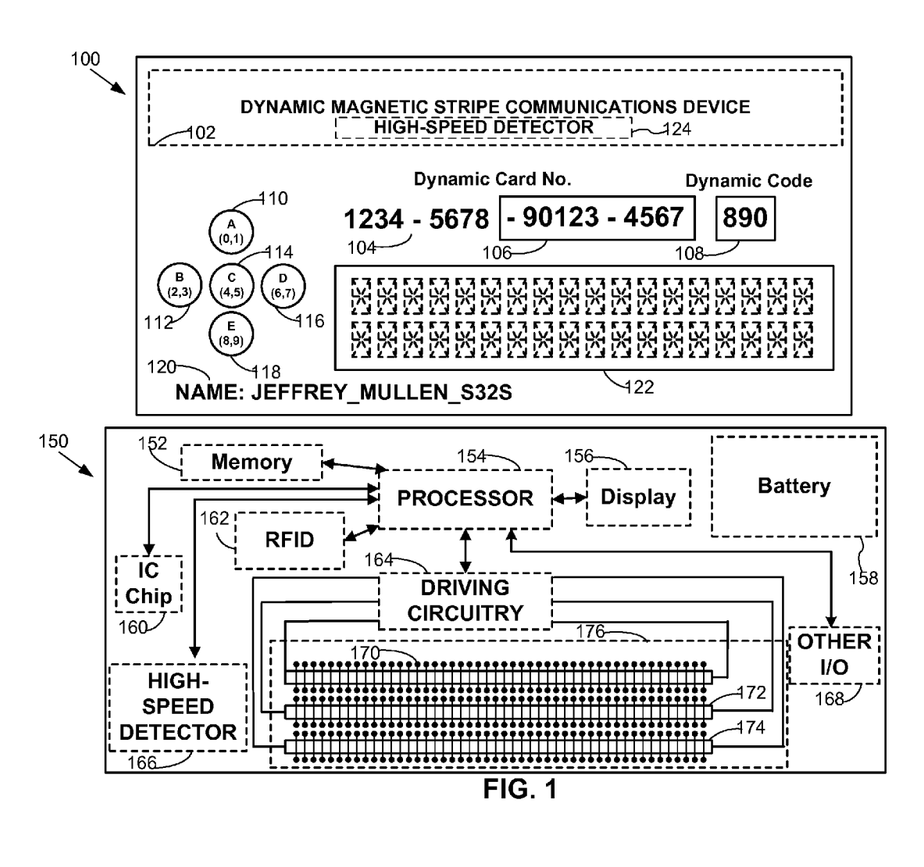
FIG. 1 is an illustration of a card constructed in accordance with the principles of the present invention.

FIG. 1 shows card 100 that may include, for example, a dynamic number that may be entirely, or partially, displayed using a display (e.g., display 106). A dynamic number may include a permanent portion such as, for example, permanent portion 104 and a dynamic portion such as, for example, dynamic portion 106. Card 100 may include a dynamic number having permanent portion 104 and permanent portion 104 may be incorporated on card 100 so as to be visible to an observer of card 100. For example, labeling techniques, such as printing, embossing, laser etching, etc., may be utilized to visibly implement permanent portion 104.

Card 100 may include a second dynamic number that may be entirely, or partially, displayed via a second display (e.g., display 108). Display 108 may be utilized, for example, to display a dynamic code such as a dynamic security code. Card 100 may include third display 122 that may be used to display graphical information, such as logos and barcodes. Third display 122 may be utilized to display multiple rows and/or columns of textual and/or graphical information.

Persons skilled in the art will appreciate that any one or more of displays 106, 108, and/or 122 may be implemented as a bi-stable display. For example, information provided on displays 106, 108, and/or 122 may be stable in at least two different states (e.g., a powered-on state and a powered-off state). Any one or more of displays 106, 108, and/or 122 may be implemented as a non-bi-stable display. For example, the display is stable in response to operational power that is applied to the non-bi-stable display. Other display types, such as LCD or electrochromic, may be provided as well.

Other permanent information, such as permanent information 120, may be included within card 100, which may include user specific information, such as the cardholder's name or username. Permanent information 120 may, for example, include information that is specific to card 100 (e.g., a card issue date and/or a card expiration date). Information 120 may represent, for example, information that includes information that is both specific to the cardholder, as well as information that is specific to card 100.

Card 100 may accept user input data via any one or more data input devices, such as buttons 110-118. Buttons 110-118 may be included to accept data entry through mechanical distortion, contact, or proximity. Buttons 110-118 may be responsive to, for example, induced changes and/or deviations in light intensity, pressure magnitude, or electric and/or magnetic field strength. Such information exchange may then be determined and processed by a processor of card 100 as data input.

One or more high-speed detectors 124 may be implemented to detect, for example, the proximity, or actual contact, of an object, such as a read-head housing of a magnetic stripe reader. High-speed detector 124 may be utilized, for example, to detect a read-head during a transaction (e.g., a card-based financial transaction) when card 100 is swiped at an increased swipe speed. During such a transaction, dynamic magnetic stripe communications device 102 may provide one or more tracks of magnetic stripe data to a detected magnetic stripe reader.

Card 100 may be implemented using architecture 150, which may include one or more processors 154. One or more processors 154 may be configured to utilize external memory 152, internal memory of processor 154, or a combination of external memory 152 and internal memory for dynamically storing information, such as executable machine language, related dynamic machine data, and user input data values.

One or more of the components shown in architecture 150 may be configured to transmit information to processor 154 and/or may be configured to receive information as transmitted by processor 154. For example, one or more displays 156 may be coupled to receive data from processor 154. The data received from processor 154 may include, for example, at least a portion of dynamic numbers and/or dynamic codes. The data to be displayed on the display may be displayed on one or more displays 156.

One or more displays 156 may be, for example, touch sensitive and/or proximity sensitive. For example, objects such as fingers, pointing devices, etc., may be brought into contact with displays 156, or in proximity to displays 156. Detection of object proximity or object contact with displays 156 may be effective to perform any type of function (e.g., transmit data to processor 154). Displays 156 may have multiple locations that are able to be determined as being touched, or determined as being in proximity to an object.

Input and/or output devices may be implemented on architecture 150. For example, integrated circuit (IC) chip 160 (e.g., an EMV chip) may be included on architecture 150, that can communicate information with a chip reader (e.g., an EMV chip reader). Radio frequency identification (RFID) module 162 may be included within architecture 150 to enable the exchange of information with an RFID reader.

Other input and/or output devices 168 may be included on architecture 150, for example, to provide any number of input and/or output capabilities. For example, other input and/or output devices 168 may include an audio device capable of receiving and/or transmitting audible information.

Other input and/or output devices 168 may include a device that exchanges analog and/or digital data using a visible data carrier. Other input and/or output devices 168 may include a device, for example, that is sensitive to a non-visible data carrier, such as an infrared data carrier or electromagnetic data carrier.

Persons skilled in the art will appreciate that a card (e.g., card 100 of FIG. 1) may, for example, be a self-contained device that derives its own operational power from one or more batteries 158. Furthermore, one or more batteries 158 may be included, for example, to provide operational power for a period of time (e.g., approximately 2-4 years). One or more batteries 158 may be included, for example, as rechargeable batteries.

Electromagnetic field generators 170-174 may be included on architecture 150 to communicate information to, for example, a read-head of a magnetic stripe reader via, for example, electromagnetic signals. For example, electromagnetic field generators 170-174 may be included to communicate one or more tracks of electromagnetic data to read-heads of a magnetic stripe reader. Electromagnetic field generators 170-174 may include, for example, a series of electromagnetic elements, where each electromagnetic element may be implemented as a coil wrapped around one or more materials (e.g., a magnetic material and/or a non-magnetic material). Additional materials may be placed outside the coil (e.g., a magnetic material and/or a non-magnetic material).

Electrical excitation by processor 154 of one or more coils of one or more electromagnetic elements via, for example, driving circuitry 164 may be effective to generate electromagnetic fields from one or more electromagnetic elements. One or more electromagnetic field generators 170-174 may be utilized to communicate electromagnetic information to, for example, one or more read-heads of a magnetic stripe reader.

Timing aspects of information exchange between the various I/O devices implemented on architecture 150 may be determined by processor 154. One or more high-speed detectors 166 may be utilized, for example, to sense the proximity, mechanical distortion, or actual contact, of an external device, which in turn, may trigger the initiation of a communication sequence by processor 154. The sensed presence, mechanical distortion, or touch of the external device may be effective to, for example, determine the type of device or object detected.

For example, the detection may include the detection of, for example, a read-head housing of a magnetic stripe reader. The detection may include a detection of a read-head housing as it moves at a high rate of speed and/or a changing rate of speed in relation to a card (e.g., card 100 of FIG. 1). In response, processor 154 may activate one or more electromagnetic field generators 170-174 to initiate a communications sequence with, for example, one or more read-heads of a magnetic stripe reader.

Persons skilled in the art will appreciate that processor 154 may provide user-specific and/or card-specific information through utilization of any one or more of buttons 110-118, RFID 162, IC chip 160, electromagnetic field generators 170-174, and other input and/or output devices 168.

Figure 2:
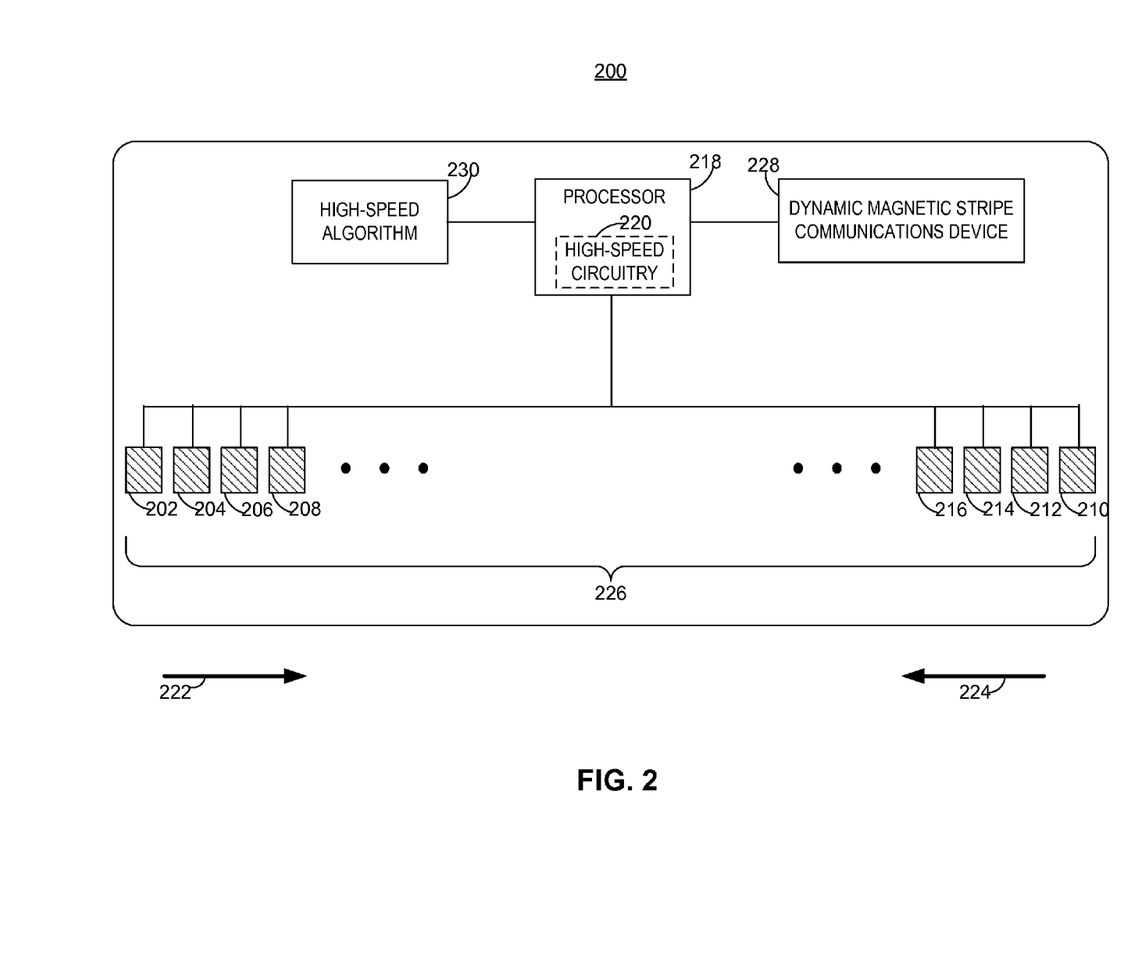
FIG. 2 is an illustration of a card constructed in accordance with the principles of the present invention.

Turning to FIG. 2, a card is shown having an orientation of detectors 226, whereby one or more detectors 202-216 may be, for example, arranged along a length of card 200. Detectors 202-216 may be provided, for example, as conductive pads using, for example, an additive technique, whereby patterns of a conductive element (e.g., copper) may be applied to a PCB substrate according to a patterning mask definition layer. Detectors 202-216 may be provided, for example, as conductive pads using, for example, a subtractive technique whereby patterns of a conductive element (e.g., copper) may be removed from a pre-plated PCB substrate according to an etching mask definition layer. Other non-PCB fabrication techniques may be used to implement conductive pads 202-216 as may be required by a particular application.

High-speed circuitry 220 of processor 218, conductive pads 202-216, processor 218, and high-speed algorithm 230 may be combined to provide a high-speed detection system. Persons skilled in the art will appreciate that a conductive pad may be utilized by a processor as a capacitive sensing pad. Particularly, a processor may include the functionality to control and determine when an object is in the proximity of one or more conductive pads via a capacitive sensing technique.

Figure 3:
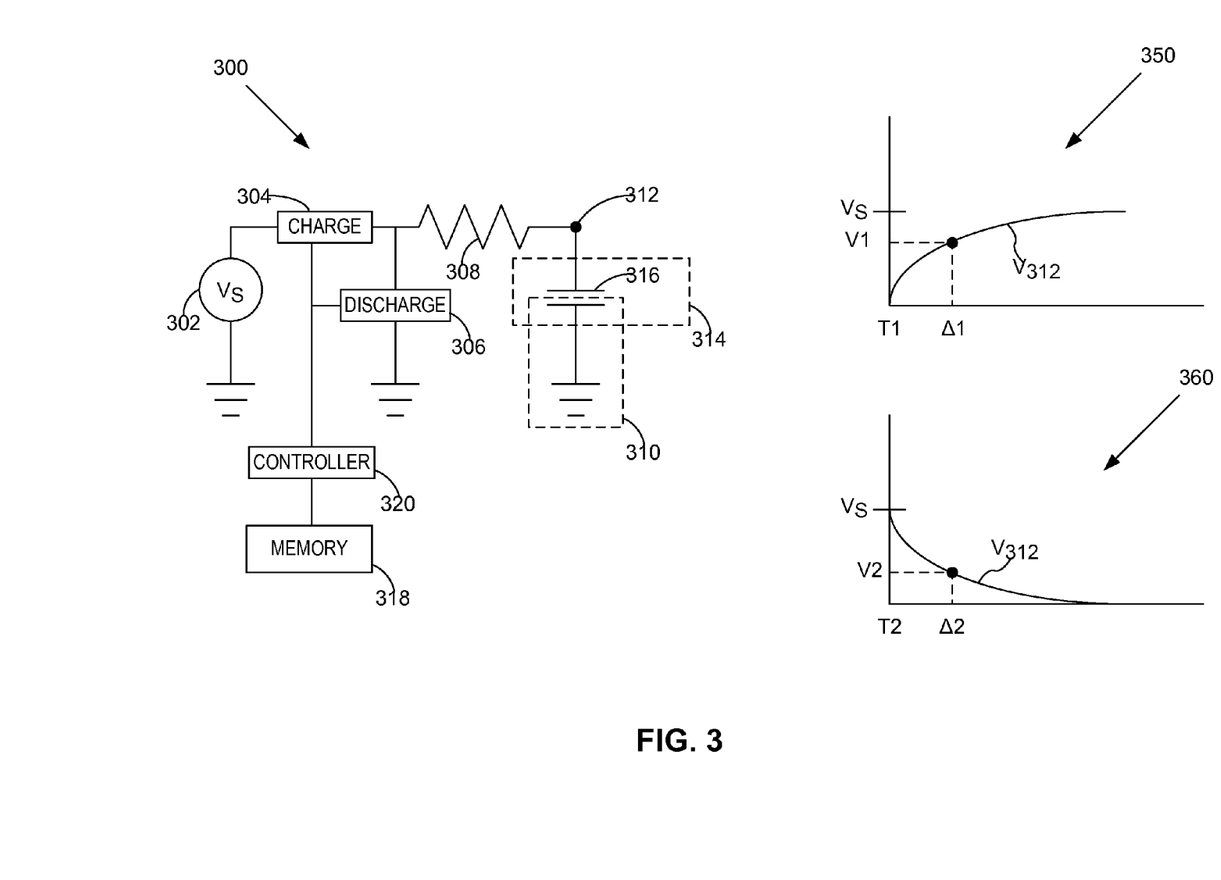
FIG. 3 is an illustration of circuitry, and associated waveforms, constructed in accordance with the principles of the present invention.

FIG. 3 shows high-speed detection circuitry 300. A conductive pad may be utilized, for example, as a conductor of a capacitive device within a resistor/capacitor (RC) circuit to determine the capacitance of a conductive pad and determine whether the capacitance is below, equal to, or above one or more predetermined thresholds.

A conductive pad may, for example, form a portion of a capacitive element, such that plate 316 of capacitive element 314 may be implemented by a conductive pad and the second plate of capacitive element 314 may be implemented by element 310. Element 310 may represent, for example, the device or object whose proximity or contact is sought to be detected.

The capacitance magnitude of capacitive element 314 may exhibit, for example, an inversely proportional relationship to the distance separation between plate 316 and device 310. For example, the capacitance magnitude of capacitive element 314 may be relatively low when the corresponding distance between plate 316 and device 310 may be relatively large. The capacitance magnitude of capacitive element 314 may be relatively large, for example, when the corresponding distance between plate 316 and device 310 is relatively small.

High-speed detection may be accomplished, for example, via circuit 300 of FIG. 3. Through a sequence of charging and discharging events, an average capacitance magnitude for capacitive element 314 may be determined over time. In so doing, the spatial relationship (e.g., the separation distance) between plate 316 and device 310 may be determined.

Charge sequence 350, for example, may be invoked, such that charge circuit 304 may be activated at time T1, while discharge circuit 306 may remain deactivated. Accordingly, for example, current may flow through resistive component 308. In doing so, for example, an electrostatic field may be generated that may be associated with capacitive component 314. During the charge sequence, for example, the voltage at node 312 may be monitored to determine the amount of time required (e.g., $T_{CHARGE} = \Delta 1 - T1$) for the voltage at node 312, $V_{312}$, to obtain a magnitude that is substantially equal to, below, or above a first threshold voltage (e.g., equal to V1).

Discharge sequence 360, for example, may be invoked, such that discharge circuit 306 may be activated at time T2, while charge circuit 304 may remain deactivated. During the discharge sequence, for example, the electric field associated with capacitive element 314 may be allowed to discharge through resistive component 308 to a reference potential (e.g., ground potential). The voltage at node 312 may be monitored to determine the amount of time required (e.g., $T_{DISCHARGE}=\Delta 2-T2$) for the voltage at node 312, $V_{312}$, to obtain a magnitude that is substantially equal to, below, or above a second threshold voltage (e.g., equal to V2).

Once the charge time, $T_{CHARGE}$, and discharge time, $T_{DISCHARGE}$, are determined, the charge and discharge times may be utilized to calculate a capacitance magnitude that may be exhibited by capacitive element 314. For example, given that the magnitude of voltage, V1, may be equal to approximately 63% of the magnitude of voltage, $V_S$, then a first relationship may be defined by equation (1) as:

$$T_{CHARGE}=R_{308}*C1, \quad (1)$$

where $R_{308}$ is the resistance magnitude of resistive element 308 and C1 is proportional to a capacitance magnitude of a capacitive element (e.g., capacitive element 314).

Similarly, for example, given that the magnitude of voltage, V2, is equal to approximately 37% of the magnitude of voltage, $V_S$, then a second relationship may be determined by equation (2) as:

$$T_{DISCHARGE}=R_{308}*C2, \quad (2)$$

where C2 is proportional to a capacitance magnitude of capacitive element 314. The capacitance magnitudes, $C_1$ and $C_2$, may then be calculated from equations (1) and (2) and averaged to determine an average capacitance magnitude that is exhibited by capacitive element 314.

Persons skilled in the art will appreciate that circuits 304 and 306 may be activated and deactivated by controller 320. Accordingly, for example, controller 320 may control when the charge and discharge events occur. Persons skilled in the art will further appreciate that controller 320 may adjust a frequency at which circuits 304 and 306 may be activated and/or deactivated, thereby adjusting a sampling rate at which the capacitance magnitudes, $C_1$ and $C_2$, may be measured. In so doing, a sampling rate (e.g., a lower sampling rate) may be selected in order to select a power consumption rate of a card (e.g., a lower power consumption rate). Controller 320 may, for example, store capacitance magnitude measurements within memory 318. Accordingly, for example, multiple capacitance magnitudes may be stored for subsequent access by controller 320.

Turning back to FIG. 2, a series of charge and discharge sequences for pads 202-216 may be executed by processor 218 to determine, for example, a relative capacitance magnitude that is exhibited by each of pads 202-216. A series of charge and discharge sequences for each of pads 202-216 may be executed by processor 218, for example, in order to obtain a capacitance characteristic for each of pads 202-216 over time.

By comparing the time-based capacitance characteristic of each pad 202-216 to a threshold capacitance value, a determination may be made, for example, as to when pads 202-216 are in a proximity, or touch, relationship with a device whose presence is to be detected. For example, a sequential change (e.g., increase) in the relative capacitance magnitudes of pads 202-208, respectively, and/or pads 216-210, respectively, may be detected and a determination may be made that a device is moving substantially in direction 222 relative to card 200. A sequential change (e.g., increase) in the relative capacitance magnitudes of detectors 210-216, respectively, and/or 208-202, respectively, may be detected, for example, and a determination may be made that a device is moving substantially in direction 224 relative to card 200.

Persons skilled in the art will appreciate that by electrically shorting pairs of detectors together (e.g., pair 202/210, pair 204/212, pair 206/214, etc.) directional vectors 222 and 224 become insubstantial. For example, regardless of whether a device is moving substantially in direction 222 or substantially in direction 224 relative to card 200, a determination may nevertheless be made that a device is close to, or touching, card 200.

High-speed circuitry 220 of processor 218 may be used in conjunction with, for example, one or more pads 202-216 to determine that a device (e.g., a read-head housing of a magnetic stripe reader) is in close proximity, or touching, one or more of pads 202-216. Processor 218 may, for example, utilize high-speed algorithm 230 to detect a device when that device is moving at a relatively high rate of speed with respect to card 200. For example, high-speed algorithm 230 may analyze a capacitance change in more than one conductive pads (e.g., non-adjacent conductive pads) to determine that a device is moving in relation to pads 202-216. Once a device is detected, processor 218 may, for example, communicate with the detected device via dynamic magnetic stripe communications device 228.

Figure 4:
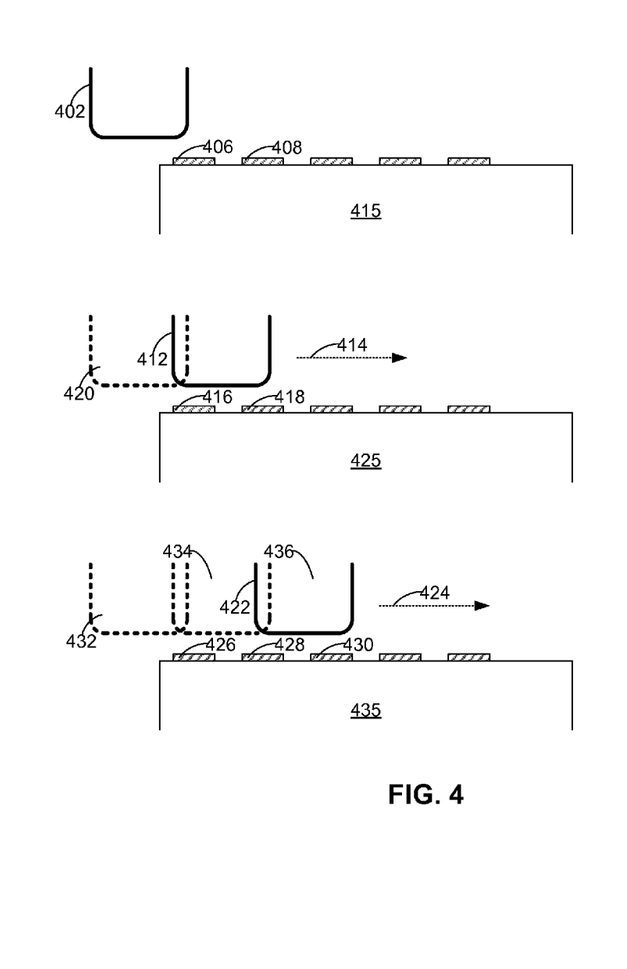
FIG. 4 is an illustration of a card constructed in accordance with the principles of the present invention.

FIG. 4 shows a card that is in proximity to a device (e.g., a read-head of a magnetic stripe reader). Card 415 may be in proximity to a device such that a distance between conductive pad 406 and read-head 402 is less than a distance between conductive pad 408 and read-head 402. Accordingly, for example, a capacitance magnitude that may be associated with conductive pad 406 may be, for example, greater than a capacitance magnitude that may be associated with conductive pad 408. In so doing, for example, a processor that may be monitoring the capacitance magnitudes of conductive pads 406 and 408 may determine that a device is closer to conductive pad 406 than to conductive pad 408.

Card 425 may be in proximity to a device (e.g., read-head 412) that may have moved from position 420 such that a distance between conductive pad 418 and device 412 may be slightly greater than a distance between conductive pad 416 and device 412.

Accordingly, for example, a capacitance magnitude that may be associated with conductive pad 416 may be, for example, slightly greater than a capacitance magnitude that may be associated with conductive pad 418. In so doing, for example, a processor that may be monitoring the capacitance magnitudes of conductive pads 416 and 418 may determine that a device may be travelling in direction 414. Further, a processor may determine that a device is slightly closer to conductive pad 416 than to conductive pad 418.

Card 435 may be in proximity to a device (e.g., read-head 422) that may have moved from position 432 to 434. Accordingly, for example, a capacitance magnitude that may be associated with conductive pad 428 may be slightly greater than a capacitance magnitude that may be associated with conductive pad 426. In so doing, for example, a processor that may be monitoring the capacitance magnitudes of conductive pads 426 and 428 may determine that a device may be travelling in direction 424. Further, a processor may determine that a device is slightly closer to conductive pad 428 than to conductive pad 426.

Device 422 may move from position 434 to position 436. Accordingly, for example, a capacitance magnitude that may be associated with conductive pad 430, for example, may be slightly greater than a capacitance magnitude that may be associated with conductive pad 428. In so doing, for example, a processor that may be monitoring the capacitance magnitudes of conductive pads 430 and 428 may determine that a device may be travelling in direction 424.

Further, a processor may determine, for example, that a device is first located closest to conductive pad 426, the device is then located closest to conductive pad 428, and the device is then located closest to conductive pad 430 in succession by detecting, for example, that a capacitance magnitude of conductive pad 426 changes (e.g., increases), followed by a capacitance change (e.g., increase) of conductive pad 428, and then followed by a capacitance change (e.g., increase) of conductive pad 430, respectively. In response to a sequential capacitance change in pads 426, 428, and 430, respectively, a processor may activate one or more electromagnetic field generators to initiate a communications sequence with, for example, read-head 422.

A sequential capacitance change in conductive pads 426-430, respectively, may not occur. For example, a speed at which a device (e.g., read-head 422) travels in direction 424 relative to card 435 may cause a processor to detect a capacitance change, for example, in conductive pad 426 followed by a capacitance change in conductive pad 430, but a capacitance change in conductive pad 428 may not be detected. Accordingly, for example, a processor may execute a detection algorithm having an awareness of capacitance changes in non-adjacent conductive pads (e.g., conductive pads separated by one or more other conductive pads). In so doing, for example, a processor may nevertheless determine that a device is moving in proximity to a card and may activate a communications device in response to such a detection. A processor may, for example, detect devices moving at increased speeds (e.g., twice an average swipe speed) without sacrificing detection accuracy.

Persons skilled in the art will appreciate that adjusting a sampling rate (e.g., reducing a sampling rate) of a detection algorithm may similarly reduce the ability, for example, to detect sequential changes in capacitance magnitudes of conductive pads 426-430, respectively. Accordingly, for example, a sampling rate of a detection algorithm may be reduced without sacrificing detection accuracy when a detection algorithm having an awareness of capacitance changes in non-adjacent conductive pads is provided.

A processor may measure a magnitude of capacitance changes in conductive pads 426-430 that is not, for example, consistent with movement of a device in direction 424. For example, a processor may first measure a capacitance magnitude associated with conductive pad 426 that may be larger than a capacitance magnitude of either of conductive pads 428 and 430. A processor may next measure a capacitance magnitude associated with conductive pad 430 that may be larger than a capacitance magnitude of either of conductive pads 426 and 428. A processor may next measure a capacitance magnitude associated with conductive pad 428 that may be larger than a capacitance magnitude of either of conductive pads 426 and 430.

In so doing, for example, movement of a device in direction 424 may be considered to be inconsistent with such a capacitance characteristic, since sequential capacitance magnitude increases may not be detected in conductive pads 426, 428, and 430, respectively. Nevertheless, a processor executing a high-speed detection algorithm may have an awareness that detected capacitance increases may be inconsistent with an actual direction of movement of a device. In so doing, for example, a processor may determine that a device (e.g., read-head 422) is in proximity to card 435, is moving in direction 424, and may, for example, activate a communications device in response to such a detection.

Figure 5:
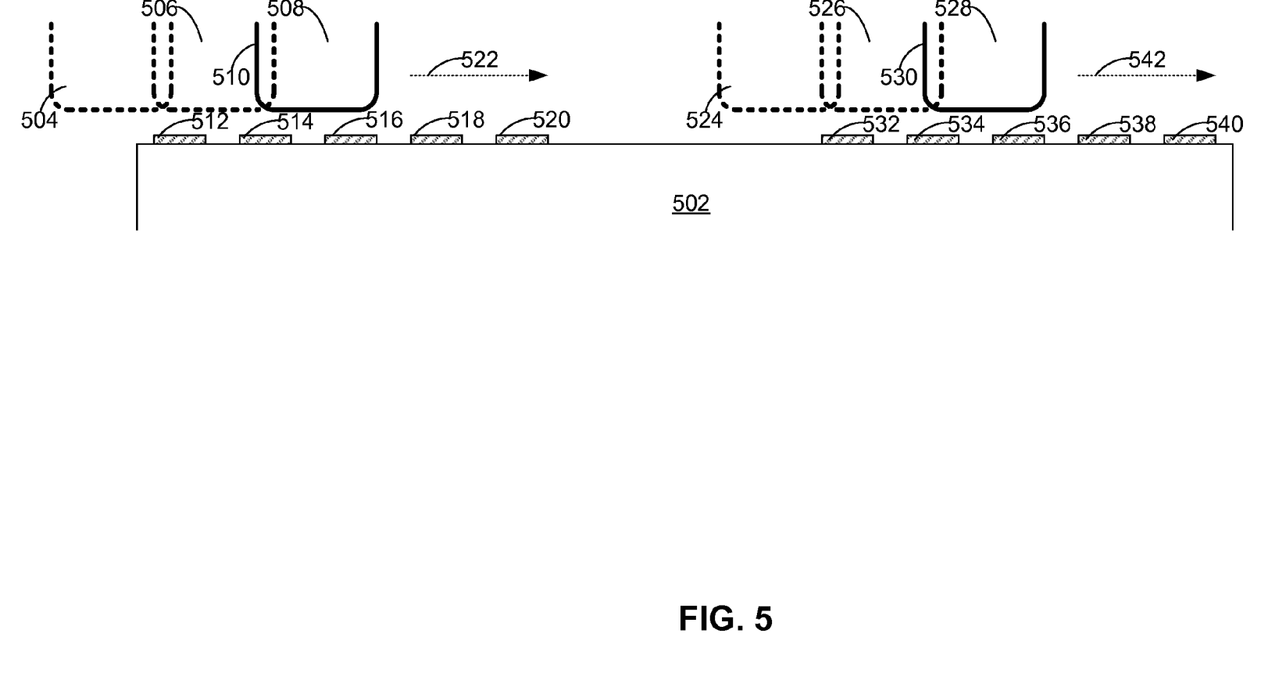
FIG. 5 is an illustration of a card constructed in accordance with the principles of the present invention.

FIG. 5 shows a card that is in proximity to a device (e.g., a read-head of a magnetic stripe reader). Card 502 may provide conductive pads 512-520 that may be used, for example, to initially detect a device (e.g., read-head 510) that may be in proximity to card 502 or that may be touching card 502. Further, a processor of card 502 may detect movement of read-head 510 in direction 522 at locations 504, 506, and 508 in no particular order. In response, a processor of card 502 may activate a communications device in response to such a detection. For example, a processor of card 502 may activate one or more electromagnetic field generators to initiate a communications sequence with, for example, read-head 510.

Card 502 may provide conductive pads 532-540 that may be used, for example, to provide post-detection of a device (e.g., read-head 530) after communications with read-head 530 have completed. Accordingly, for example, a presence of a device may be re-verified, for example, so as to confirm that a device was accurately detected and that communications with that device was most likely successful.

Post-detection verification may be useful, for example, if a processor of card 502 implements a power-savings mode. For example, a processor of card 502 may verify through post-detection verification that a presence of a device was detected and that a presence of a device was verified after communications with the device has completed. In so doing, for example, a processor of card 502 may immediately enter a power-savings mode, rather than lingering in a normal-power mode while waiting to re-establish communications with a device.

Figure 6:
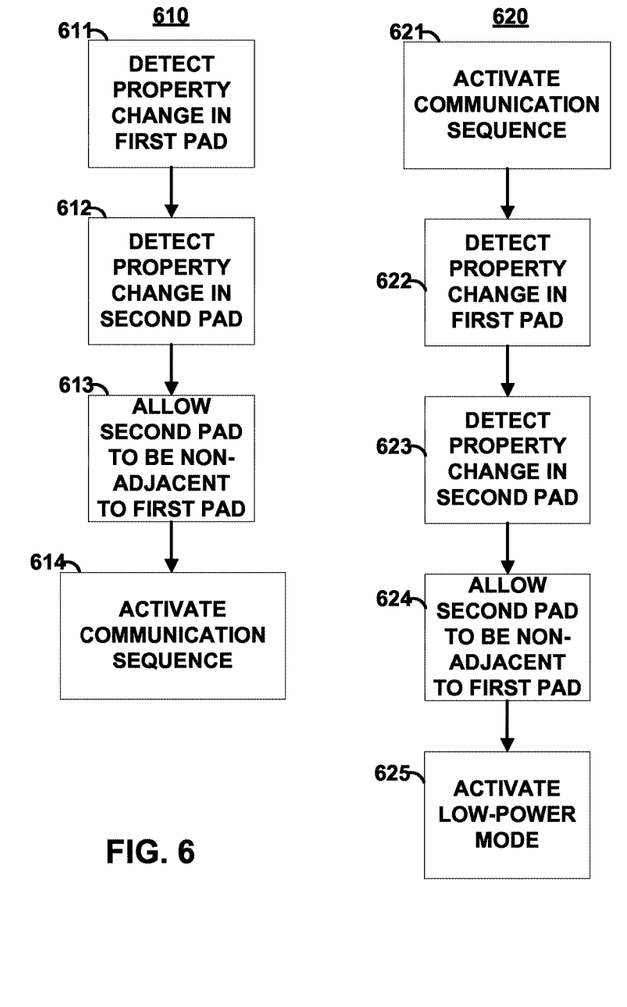
FIG. 6 is an illustration of process flow charts constructed in accordance with the principles of the present invention.

A flow diagram of a detection activity is shown in FIG. 6. Step 611 of sequence 610 may initiate a detection operation, for example, where a capacitance change (e.g., an increased capacitance) associated with a conductive pad is detected. A capacitance change (e.g., a capacitance increase) may then be detected in a second conductive pad (e.g., as in step 612). Capacitance changes in each of the first and second conductive pads are allowed to occur in non-adjacent conductive pads (e.g. as in step 613). In so doing, a detection activity may be sensitive to capacitance changes in non-adjacent conductive pads that may result, for example, from fast-moving devices (e.g., a card being swiped quickly across a read-head of magnetic stripe reader). A sampling rate associated with the detection activity may be adjusted (e.g., decreased) thereby causing, for example, detected capacitance changes in non-adjacent pads without risking a decrease in detection sensitivity. A communication sequence (e.g., as in step 614) may nevertheless be activated.

A card may be fully operational (e.g., as in step 621 of sequence 620), whereby a communication sequence may be activated after a device is detected to be in proximity, or touching, the card. Once the communication sequence is completed, a capacitance change (e.g., an increased capacitance) associated with a conductive pad may be detected (e.g., as in step 622). A capacitance change (e.g., a capacitance increase) may then be detected in a second conductive pad (e.g., as in step 623). Capacitance changes in each of the first and second conductive pads may, for example, be detected in non-adjacent conductive pads (e.g. as in step 624).

Post-communication detection mechanisms may, for example, remain sensitive to fast-moving devices and/or reduced sampling rates that may, for example, result in detected capacitance changes in non-adjacent conductive pads. Once a post-communication detection has occurred, for example, a card may immediately transition to a low-power mode of operation (e.g., as in step 625). In so doing, for example, a card need not linger in a normal-mode of operation to remain ready to re-communicate, since a post-communication detection activity substantially verifies that an original detection of a device was legitimate and further that a subsequent communication to the detected device was most likely successful.

Persons skilled in the art will also appreciate that the present invention is not limited to only the embodiments described. Instead, the present invention more generally involves dynamic information and the exchange thereof. Persons skilled in the art will also appreciate that the apparatus of the present invention may be implemented in other ways than those described herein. All such modifications are within the scope of the present invention, which is limited only by the claims that follow.

What is claimed is:

1. A method, comprising:
    detecting a presence of a read-head housing of a magnetic stripe reader using a first conductive pad;
    detecting a presence of the read-head housing of the magnetic stripe reader using a second conductive pad, wherein the first conductive pad and the second conductive pad are non-adjacent; and
    activating a communication sequence with the magnetic stripe reader based on a plurality of detections including a first detection of the read-head housing during the detecting a presence of a read-head housing of a magnetic stripe reader using a first conductive pad and a second detection of the read-head housing during the detecting the presence of the read-head housing of the magnetic stripe reader using a second conductive pad.

2. The method of claim 1, further comprising:
    failing to detect a presence of a read-head housing of a magnetic stripe reader using a third conductive pad.

3. The method of claim 1, further comprising:
    failing to detect a presence of a read-head housing of a magnetic stripe reader using a third conductive pad, the third conductive pad between the first conductive pad and the second conductive pad.

4. The method of claim 1, further comprising:
    failing to detect a presence of a read-head housing of a magnetic stripe reader using a third conductive pad, the third conductive pad between the first conductive pad and the second conductive pad,
    wherein the detecting a presence of a read-head housing of a magnetic stripe reader using a first conductive pad, the detecting a presence of a read-head housing of a magnetic stripe reader using a second conductive pad, and the failing to detect a presence of a read-head housing of a magnetic stripe reader using a third conductive pad are each based on at least one detection threshold.

5. The method of claim 1, further comprising:
    failing to detect a presence of a read-head housing of a magnetic stripe reader using a third conductive pad,
    wherein the detecting a presence of a read-head housing of a magnetic stripe reader using a first conductive pad, the detecting a presence of a read-head housing of a magnetic stripe reader using a second conductive pad, and the failing to detect a presence of a read-head housing of a magnetic stripe reader using a third conductive pad are each based on at least one detection threshold.

6. The method of claim 1, wherein a third conductive pad is between the first conductive pad and the second conductive pad.

7. The method of claim 1, wherein a third conductive pad and a fourth conductive pad are between the first conductive pad and the second conductive pad.

8. The method of claim 1, further comprising:
    failing to detect a presence of a read-head housing of a magnetic stripe reader using a third conductive pad,
    wherein the activating a communication sequence includes activating the communication sequence based on the failing to detect a presence of a read-head housing.

9. The method of claim 1, wherein the first conductive pad is part of a resistor/capacitor (RC) circuit.

10. A method, comprising:
    detecting a presence of a read-head of a magnetic stripe reader using a first conductive pad;
    detecting the presence of the read-head of the magnetic stripe reader using a second conductive pad, wherein the first conductive pad and the second conductive pad are non-adjacent; and
    activating a communication sequence with the magnetic stripe reader based on a plurality of detections including a first detection of the read-head of the magnetic stripe reader during the detecting a presence of a read-head of a magnetic stripe reader using a first conductive pad and a second detection of the read-head of the magnetic stripe reader during the detecting the presence of the read-head of the magnetic stripe reader using a second conductive pad.

11. The method of claim 10, further comprising:
    failing to detect a presence of a read-head of a magnetic stripe reader using a third conductive pad.

12. The method of claim 10, further comprising:
    failing to detect a presence of a read-head of a magnetic stripe reader using a third conductive pad, the third conductive pad between the first and second conductive pads.

13. The method of claim 10, further comprising:
    failing to detect a presence of a read-head of a magnetic stripe reader using a third conductive pad, the third conductive pad between the first conductive pad and the second conductive pad,
    wherein the detecting a presence of a read-head of a magnetic stripe reader using a first conductive pad, the detecting a presence of a read-head of a magnetic stripe reader using a second conductive pad, and the failing to detect a presence of a read-head of a magnetic stripe reader using a third conductive pad are based on at least one detection threshold.

14. The method of claim 10, further comprising:
    failing to detect a presence of a read-head of a magnetic stripe reader using a third conductive pad,
    wherein the detecting a presence of a read-head of a magnetic stripe reader using a first conductive pad, the detecting a presence of a read-head of a magnetic stripe reader using a second conductive pad, and the failing to detect a presence of a read-head of a magnetic stripe reader using a third conductive pad are based on at least one detection threshold.

15. The method of claim 10, wherein a third conductive pad is between the first conductive pad and the second conductive pad.

16. The method of claim 10, wherein a third conductive pad and a fourth conductive pad are between the first conductive pad and the second conductive pad.

17. The method of claim 10, further comprising:
   failing to detect a presence of a read-head of a magnetic stripe reader using a third conductive pad,
   wherein the activating a communication sequence includes activating the communication sequence based on the failing to detect a presence of a read-head.

18. The method of claim 10, wherein the first conductive pad is part of a resistor/capacitor (RC) circuit.

* * * * *